(12) United States Patent
Magnell et al.

(10) Patent No.: US 9,573,336 B2
(45) Date of Patent: Feb. 21, 2017

(54) APPARATUS FOR AUTOMATICALLY GLUING HEAD AND TAIL ENDS OF STOCK MATERIAL

(71) Applicant: Plymouth Packaging Inc., Battle Creek, MI (US)

(72) Inventors: Greg Magnell, Vicksburg, MI (US); Jeffrey Willers, Phillips, WI (US); David G. Flessert, Phillips, WI (US)

(*) Notice: Subject to any disclaimer, the term of this patent is extended or adjusted under 35 U.S.C. 154(b) by 118 days.

(21) Appl. No.: 14/454,002

(22) Filed: Aug. 7, 2014

(65) Prior Publication Data

US 2015/0041064 A1 Feb. 12, 2015

Related U.S. Application Data

(60) Provisional application No. 61/863,136, filed on Aug. 7, 2013.

(51) Int. Cl.
*B05C 13/02* (2006.01)
*B31B 1/52* (2006.01)
(Continued)

(52) U.S. Cl.
CPC . *B31B 1/00* (2013.01); *B31B 1/52* (2013.01); *B31B 1/62* (2013.01); *B31B 19/52* (2013.01); *B31B 19/62* (2013.01); *B32B 37/142* (2013.01); *B31B 2201/2691* (2013.01); *B31B 2201/6017* (2013.01); *B31B 2201/94* (2013.01);
(Continued)

(58) Field of Classification Search
CPC ........... Y10T 156/103; Y10T 156/1036; Y10T 156/1051; B32B 37/142; B31B 1/52; B31B 1/62; B31B 19/52; B31B 19/62; B31B 2201/267; B31B 2201/6017; B31B 2201/94; B05C 13/02
See application file for complete search history.

(56) References Cited

U.S. PATENT DOCUMENTS 5,048,809 A * 9/1991 Tebbe .................... B65H 45/30
                                                                      118/32
5,213,560 A * 5/1993 Crowley ................ B42D 15/08
                                                                      156/277

(Continued)

FOREIGN PATENT DOCUMENTS

EP        0190580 A2 *  8/1986 .............. B31B 1/30
JP        3441083 B2 *  8/2003 .............. B43M 3/04

*Primary Examiner* — Mark A Osele
(74) *Attorney, Agent, or Firm* — John G. Posa; Belzer PC

(57) ABSTRACT

Feedstock is delivered perpendicular to the line of applied glue in an automated gluing machine, thereby simplifying operation and better accommodating other in-line factory or assembly processes. The machine comprises an input nip for receiving the head end and the tail end of a sheet stock in overlapping registration, with the tail end being longer than the head end. A clamp mechanism holds the overlapping sheet stock in position while a glue applicator applies glue to one side of the tail end. An output nip holds the glued side of the tail end against the head end, and apparatus is provided for ejecting the sheet stock once the tail end has been glued to the head end. The glued stock may be ejected back toward the operator or away from the operator and through the machine, enabling the machine to be placed in-line with other machines for a continuous directional or linear flow.

16 Claims, 15 Drawing Sheets

(51) Int. Cl.
*B31B 1/00* (2006.01)
*B31B 1/62* (2006.01)
*B31B 19/52* (2006.01)
*B32B 37/14* (2006.01)
*B31B 19/62* (2006.01)
*B42D 15/08* (2006.01)

(52) U.S. Cl.
CPC .......... *B31B 2203/00* (2013.01); *B42D 15/08* (2013.01); *Y10T 156/103* (2015.01); *Y10T 156/1036* (2015.01); *Y10T 156/1051* (2015.01)

(56) References Cited

U.S. PATENT DOCUMENTS

| | | | | |
|---|---|---|---|---|
| RE34,338 E | * | 8/1993 | Beck | ........................ B43M 3/04 |
| | | | | 156/217 |
| 6,080,251 A | * | 6/2000 | Baker | .................... B31F 1/0025 |
| | | | | 156/227 |
| 6,432,232 B1 | * | 8/2002 | Martin | .................... B43M 5/042 |
| | | | | 156/217 |
| 2012/0028776 A1 | | 2/2012 | Pettersson et al. | |
| 2014/0099462 A1 | * | 4/2014 | Swaroop | ................. B29C 53/48 |
| | | | | 428/36.9 |

* cited by examiner

GLUE JOINT FOLDED

APPARATUS FOR AUTOMATICALLY GLUING HEAD AND TAIL ENDS OF STOCK MATERIAL

REFERENCE TO RELATED APPLICATION

This application claims priority from U.S. Provisional Patent Application Ser. No. 61/863,136, filed Aug. 7, 2013, the entire content of which is incorporated herein by reference.

FIELD OF THE INVENTION

This invention relates generally to automatic gluing machines and, in particular, to apparatus for automatically gluing the head and/or tail ends of stock material.

BACKGROUND OF THE INVENTION

While automatic gluing machines for cardboard boxes and cartons do exist, feed stock is delivered in parallel with the glue line. As such, the longer the glue line, the larger such machines tend to be, increasing the footprint of the equipment, if not the cost.

One attempt at a smaller footprint is described in Published U.S. Application No. 20120028776, entitled Automated Gluing Device. The device includes a support structure upon which a gluing apparatus and a support plate assembly are mounted. The support plate is configured for supporting and aligning a gluable item for gluing and assembly by the gluing apparatus. The gluing apparatus includes a first clamp configured for selectively and securely holding a first portion of the gluable item on the support plate, a glue dispensing nozzle fluidly coupled to a glue supply, and a folding apparatus configured for folding the first portion of the gluable item onto a second portion of the gluable item after glue has been applied. The gluing device is sized and configured to fit within a relatively small area so that the device can be placed in close proximity to other box processing devices. The gluing device is adapted to glue a box blank when the box blank is folded so the glue tab is positioned on an edge of the box blank, thereby eliminating the need for a large frame in order to apply glue to the glue tab.

Gluing devices like the one just described lack various features that impart versatility, including the ability to eject the glued stock in forward or reverse directions.

SUMMARY OF THE INVENTION

This invention differs from the existing art by providing a machine wherein feedstock is delivered perpendicular to the line of applied glue, thereby simplifying operation and better accommodating other in-line factory or assembly processes. In addition, the glued stock may be ejected back toward the operator or away from the operator and through the machine, enabling the machine to be placed in-line with other machines for a continuous directional or linear flow through a factory environment.

According to the invention, a machine for gluing together two ends of a sheet stock comprises an input nip for receiving the head end and the tail end of a sheet stock in overlapping registration, with the tail end being longer than the head end. A clamp mechanism holds the overlapping sheet stock in position while a glue applicator applies glue to one side of the tail end. An output nip holds the glued side of the tail end against the head end, and apparatus is provided for ejecting the sheet stock once the tail end has been glued to the head end.

The sheet stock may be paper, cardboard, carton stock, corrugated, plastic sheet, or fibrous material, and the glue may be a hot- or cold-melt adhesive of any appropriate formulation. The glue applicator moves along the tail end to apply the glue in any desired pattern.

The machine may further include a fold mechanism to apply an initial fold to the tail end prior to the application of the glue. In one embodiment, the input and output nips are implemented with rollers. The apparatus for ejecting the sheet stock may deliver the glued material in the same direction in which it was received, or the apparatus for ejecting the sheet stock may deliver the glued material in the opposite direction in which it was received.

DETAILED DESCRIPTION OF THE INVENTION

Figure 1:
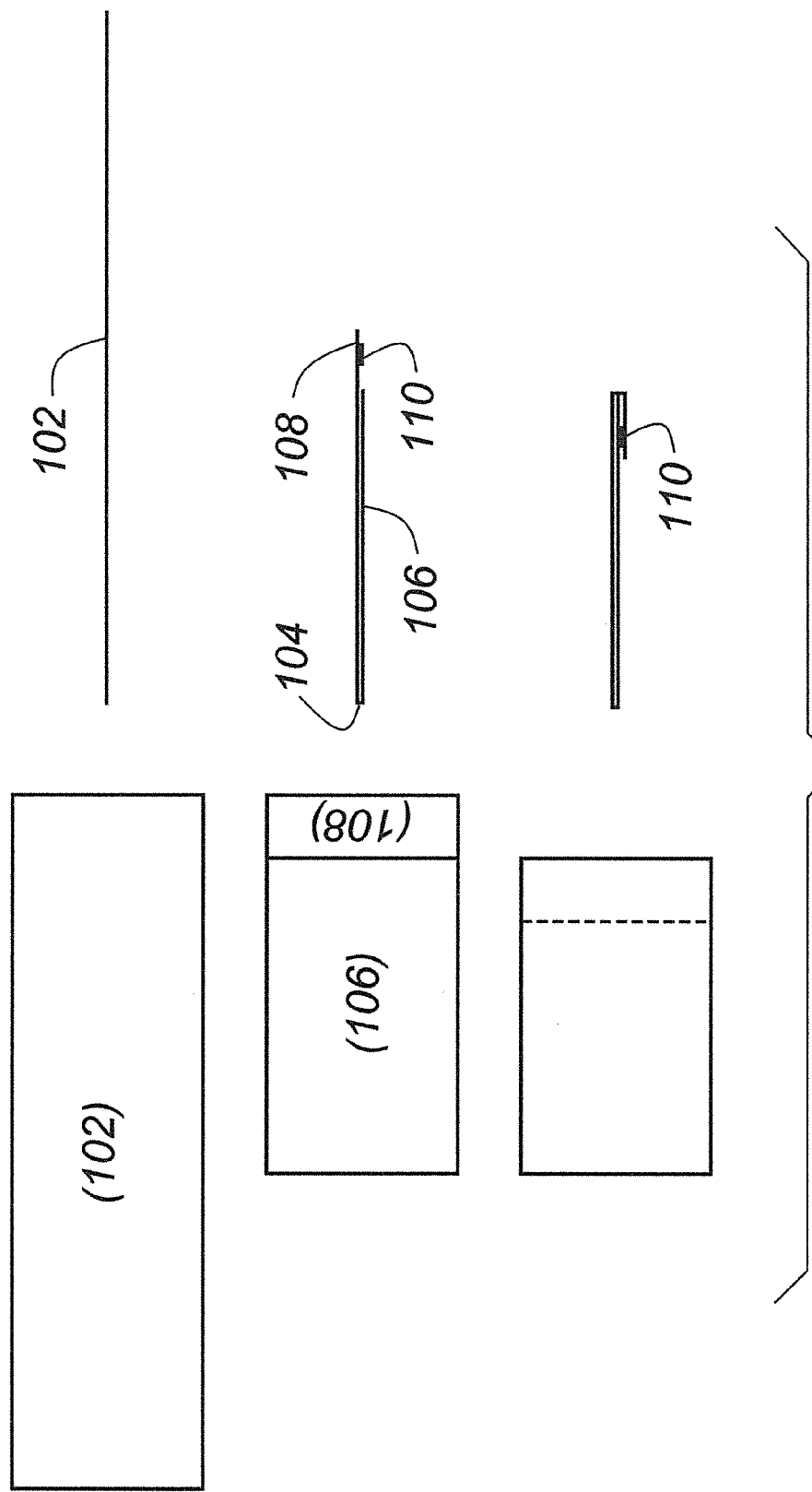
FIG. 1 is a simplified diagram which shows the way in which a sheet of stock is glued in accordance with the invention.

FIG. 1 is a simplified diagram which shows the way in which a sheet of stock 102 is glued by the invention. FIG. 1 shows top views, whereas FIG. 1B shows side or cross-sectional views. The sheet 102 is folded at 104 prior to insertion into the machine, producing a longer tail portion 108 compared to head portion 106. The apparatus applies a glue pattern 110 to the tail portion 108, then folds the tail 108 around and over the head portion, thereby bonding the overlap. The invention is not limited in terms of feedstock and/or glue. The sheet of material can be corrugated, carton stock, plastic, etc. The adhesive can be hot-melt glue, cold-set (i.e., white) glue, etc.

The machine includes the following components, which may be labeled in different drawings: frame assembly (202); control computer (204); in-feed nip (306); sheet detecting sensors (502, 710); plate mandrel (504); hold down mechanism (606, 608); out-feed nip (800); processor (computer, plc, etc. 204); motors and drives to drive the in-feed and out-feed nips 402, 404, 709, 902; actuators to actuate the out-feed nip (801) and out-feed nip rolls (803); and glue applicator (704).

Figure 2:
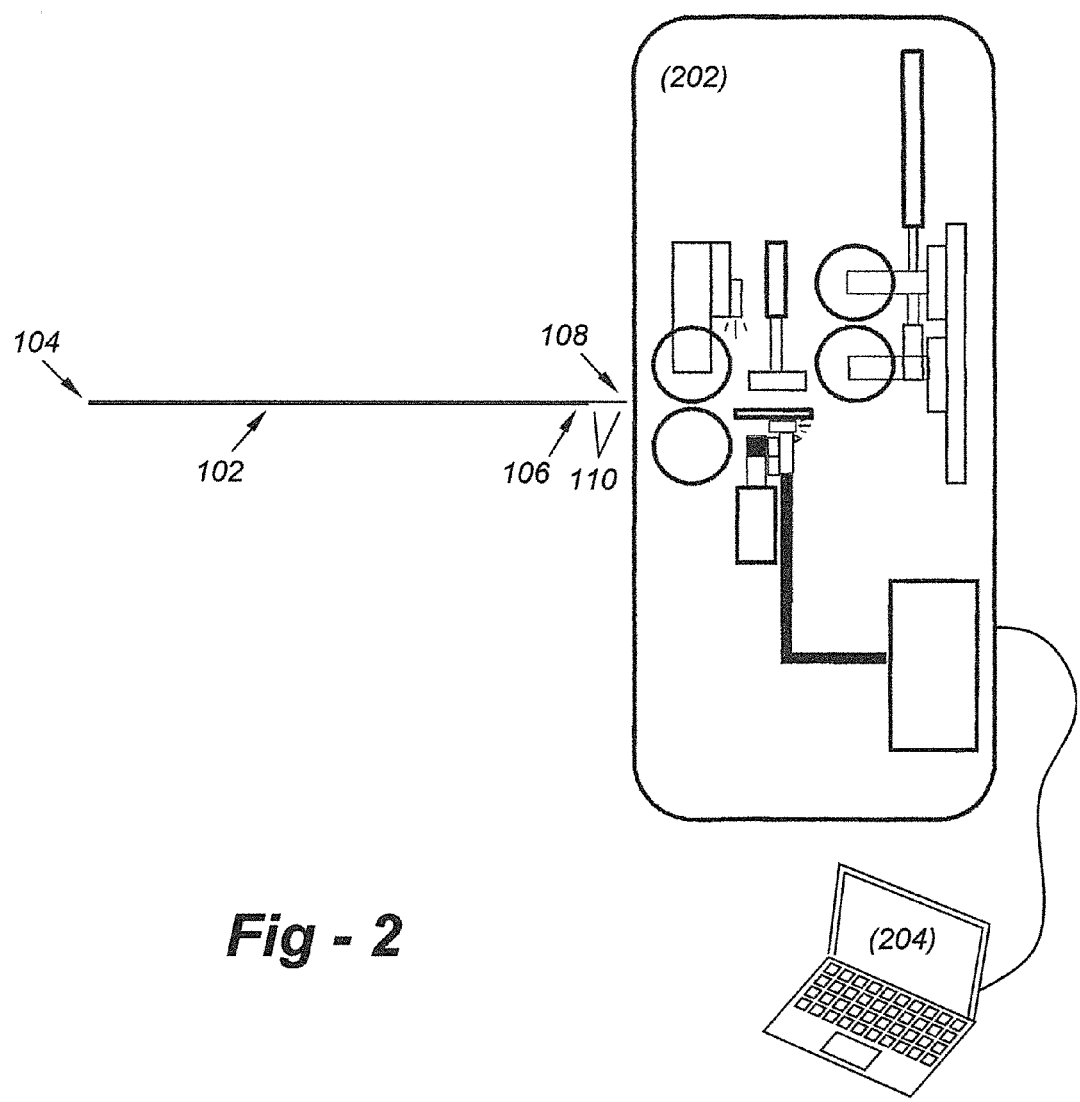
FIG. 2 is a simplified, side-view cross section of an inventive machine, showing the pre-folded sheet prior to insertion.

FIG. 2 is a simplified, side-view cross section of the machine, showing the pre-folded sheet 102 prior to insertion. The sheet 102 is inserted into machine with tail of sheet folded over the head of sheet and extending past head a fixed or variable amount (amount=glue joint). While the drawings will show the tail above the head, the arrangement may be reversed with appropriate engineering modification.

Figure 3:
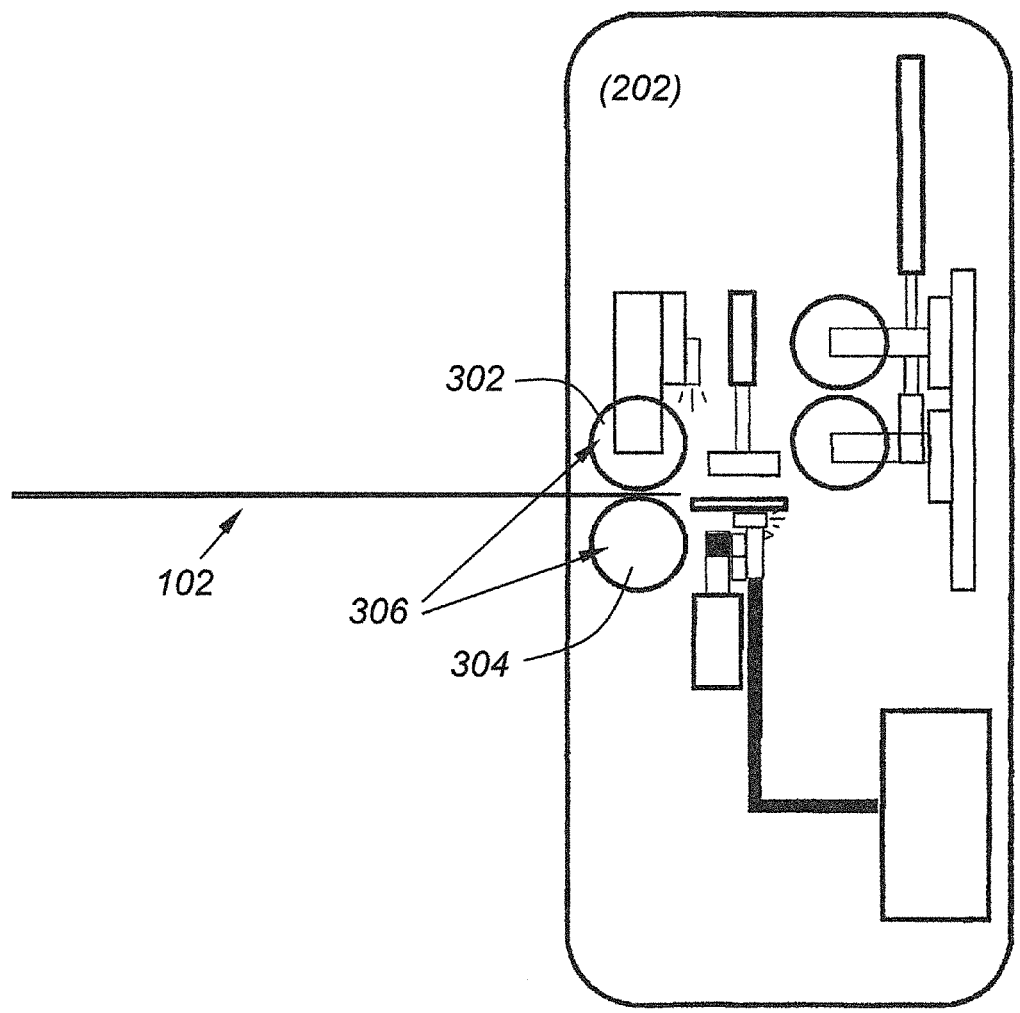
FIG. 3 shows how a folded sheet is inserted into the machine into a set of rolls as part of an in-feed nip.
Figure 4:
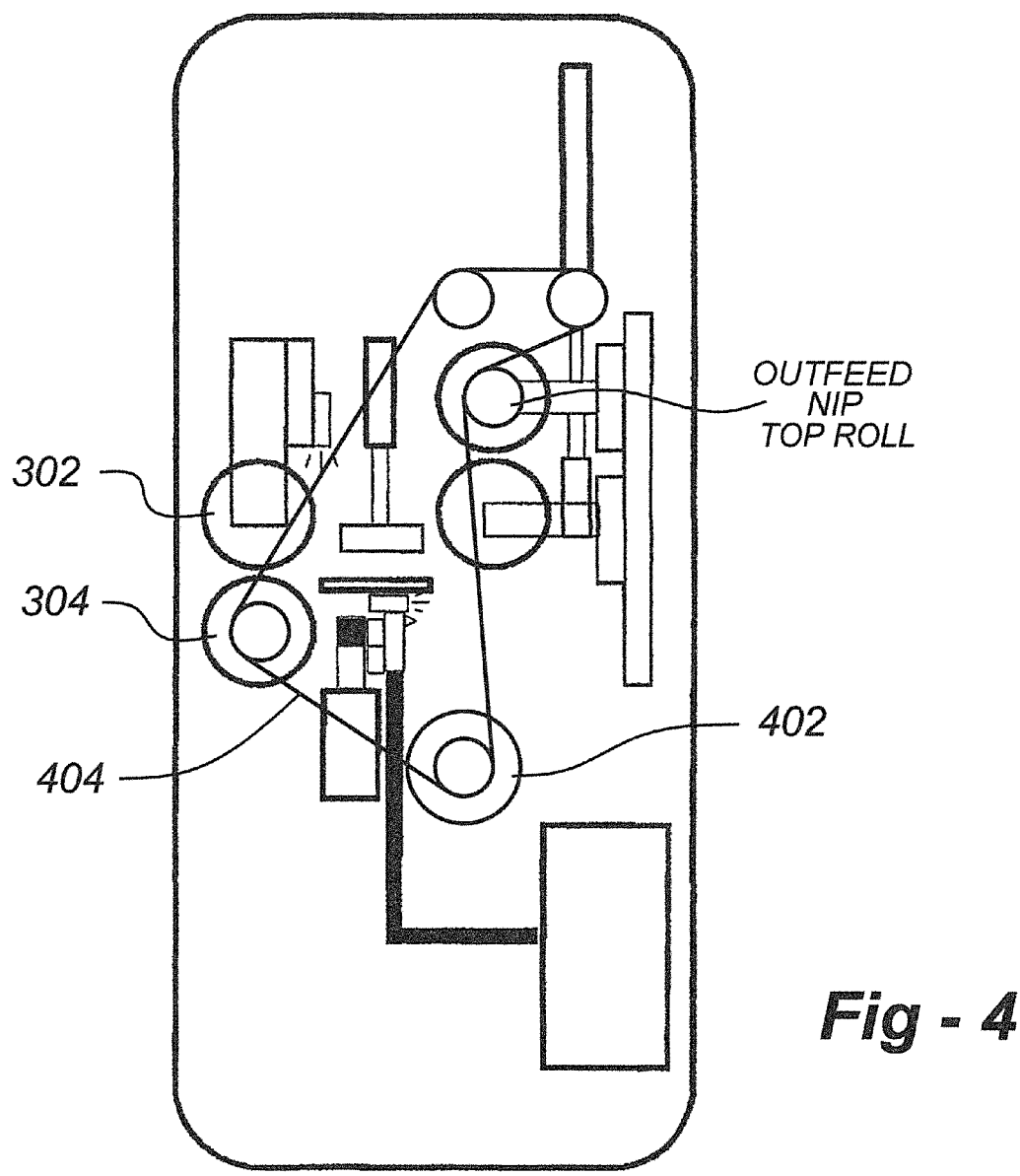
FIG. 4 illustrates a bottom roll driven by a motor and a belt.

The folded sheet 102 is inserted into machine into a set of rolls 302, 304 (in-feed nip 306, FIG. 3). As shown in FIG. 4, the bottom roll 304 is driven by a motor 402 and belt 404. The upper roll 302 includes a non-driven top set of wheels, but could also be a full non-driven idle roll. The upper roll could be mechanically coupled to provide a driven upper roll or could be independently driven. The motor 402 also drives the top roll of the out-feed nip as described below.

Figure 5:
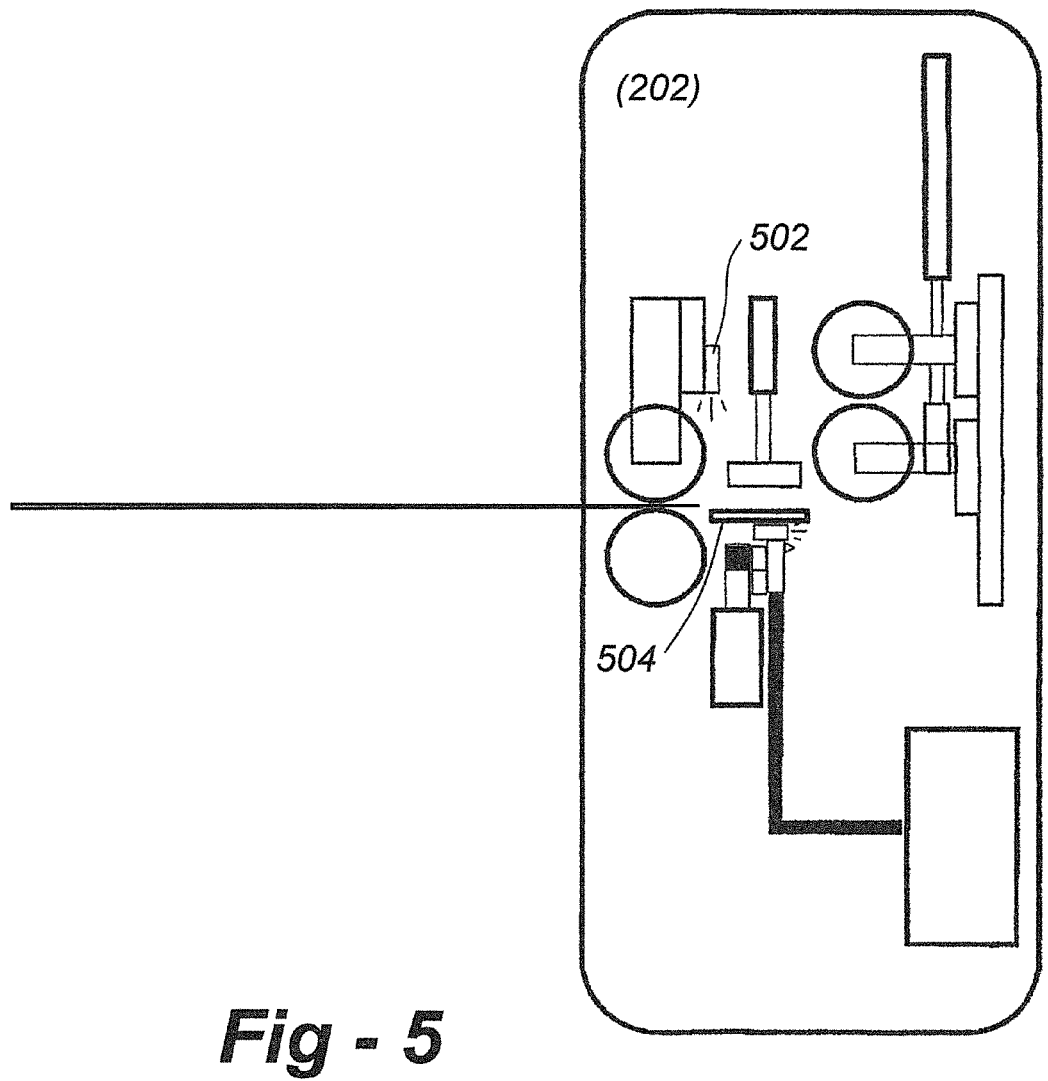
FIG. 5 shows the way in which a photo sensor is mounted to detect the sheet as it travels forward through the machine.
Figure 6:
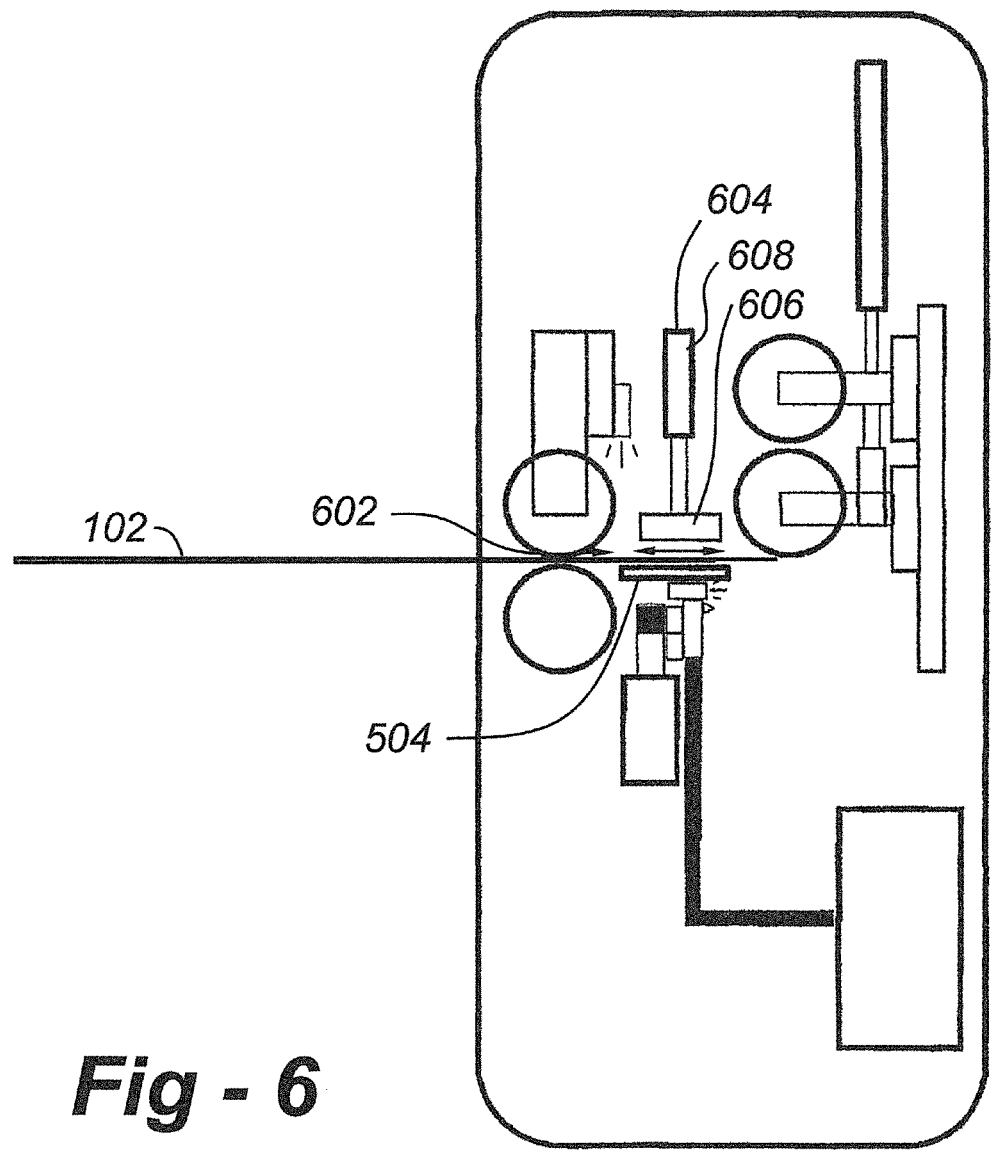
FIG. 6 depicts how, after a sensor has detected a sheet, it is conveyed forward by a fixed distance and stops.

The in-feed nip conveys sheet 102 forward along a forward path (board line). A photo sensor 502 is mounted to detect the sheet as it travels forward through the machine (FIG. 5). Photo sensor 502 can be mounted above the board line or below the board line, and can be implemented with a laser, through-beam, or other photo-electric sensor. After sensor 502 has detected sheet 102, it is conveyed forward by a fixed distance 602 and stops (FIG. 6). At the stop position, a portion of the sheet is over plate mandrel 504. The glue joint extends past plate mandrel.

Figure 7:
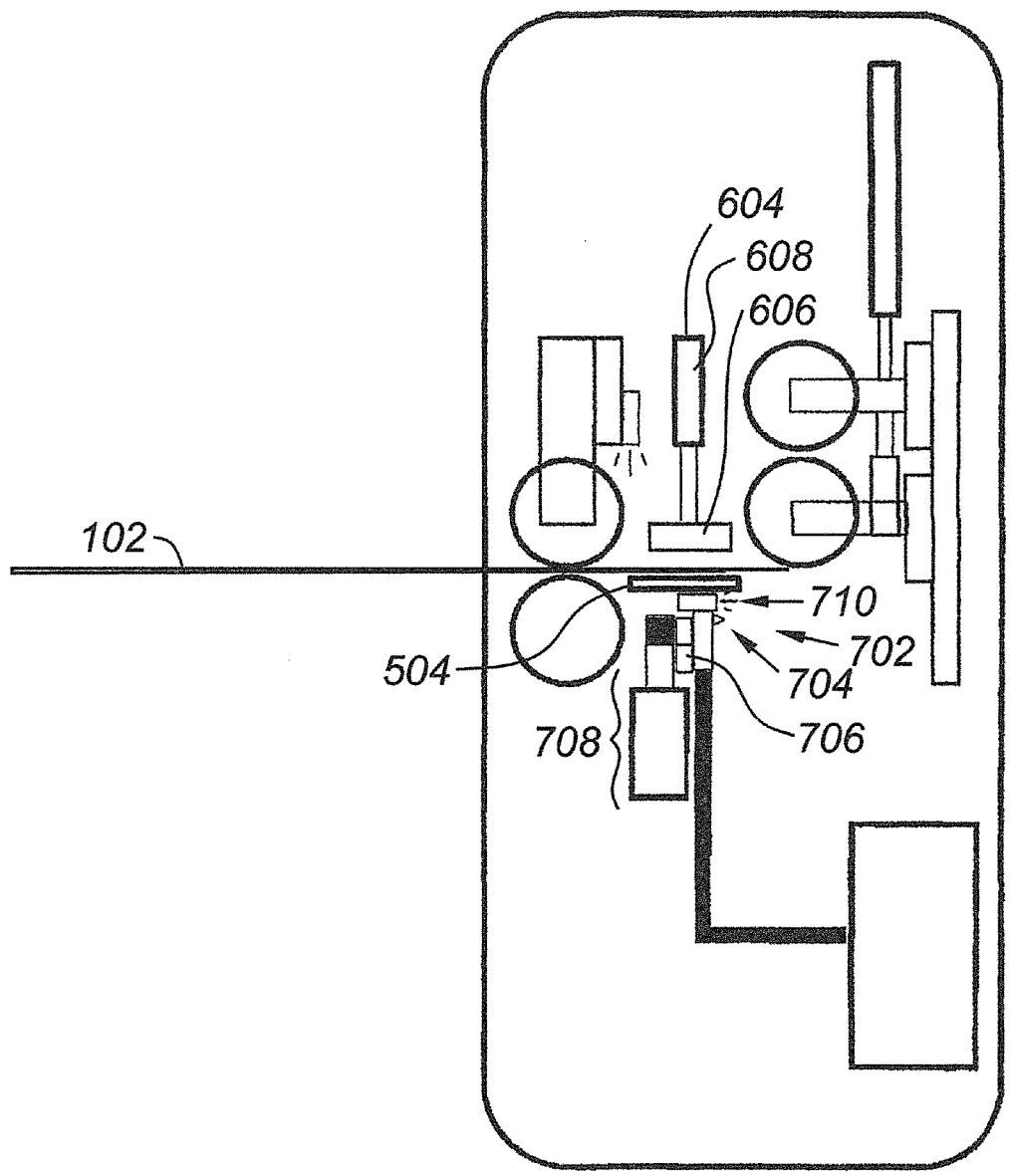
FIG. 7 illustrates a hold-down mechanism that holds the sheet onto a plate mandrel at the stop position.

A hold down mechanism 604 holds the sheet onto the plate mandrel at the stop position (FIG. 7). Hold down mechanism 604 is comprised of a plate 606 oriented parallel to the board line that can be vertically positioned via a set of actuators (pneumatic cylinders 608).

A glue applicator 702, mounted below the plate mandrel 504, includes a glue dispensing head 704 mounted on a linear positioning guide 706, attached to an adhesive feeding mechanism 708, and a photo-sensor 710 mounted to the glue dispensing head 704. Linear positioning guide 706 is mounted below plate mandrel across the machine opposite the sheet travel direction.

Figure 9:
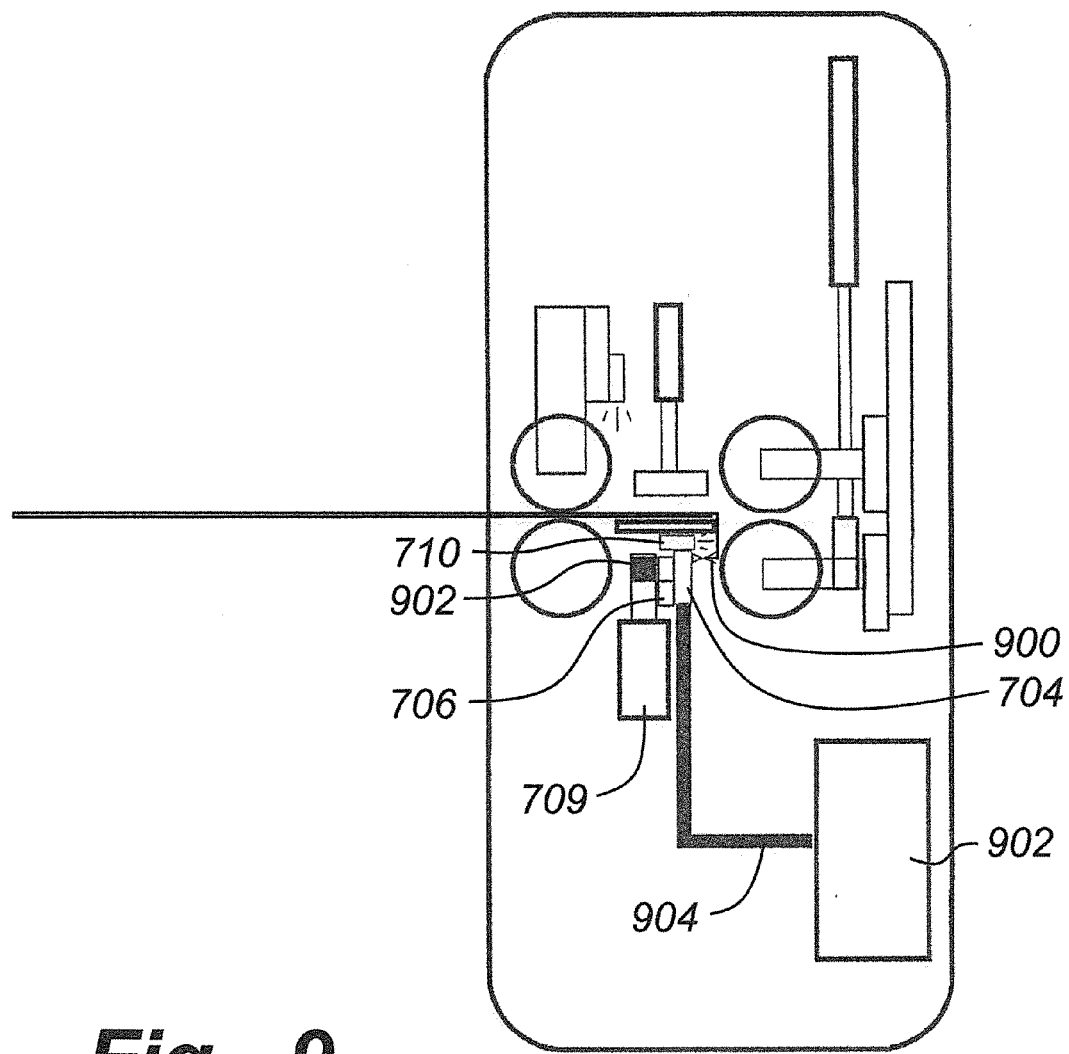
FIG. 9 shows how the glue applicator is positioned at a start position then moved across the machine via belt to detect the glue joint using a photo sensor.

As one example of several, the adhesive feed system 902 can be a hot melt glue system comprised of a glue holding and heating tank that pumps glue to the glue dispensing through a hose 904 (FIG. 9). Again, photo sensor 710 can be a laser, through-beam, or other photo-electric sensor. The glue applicator is positioned by a motor-driven belt drive attached to the glue dispensing head.

The out-feed nip is comprised of two rollers, 804, 806 mounted on a set of linear positioning guides 806, 808. The out-feed nip can be vertically positioned via actuators. The bottom roller 804 of the out-feed nip can be independently actuated to adjust vertical position to open and close the out-feed nip. The top roller 802 of the out-feed nip is driven by motor 402. The bottom roller 804 is a non-driven roller.

Figure 8:
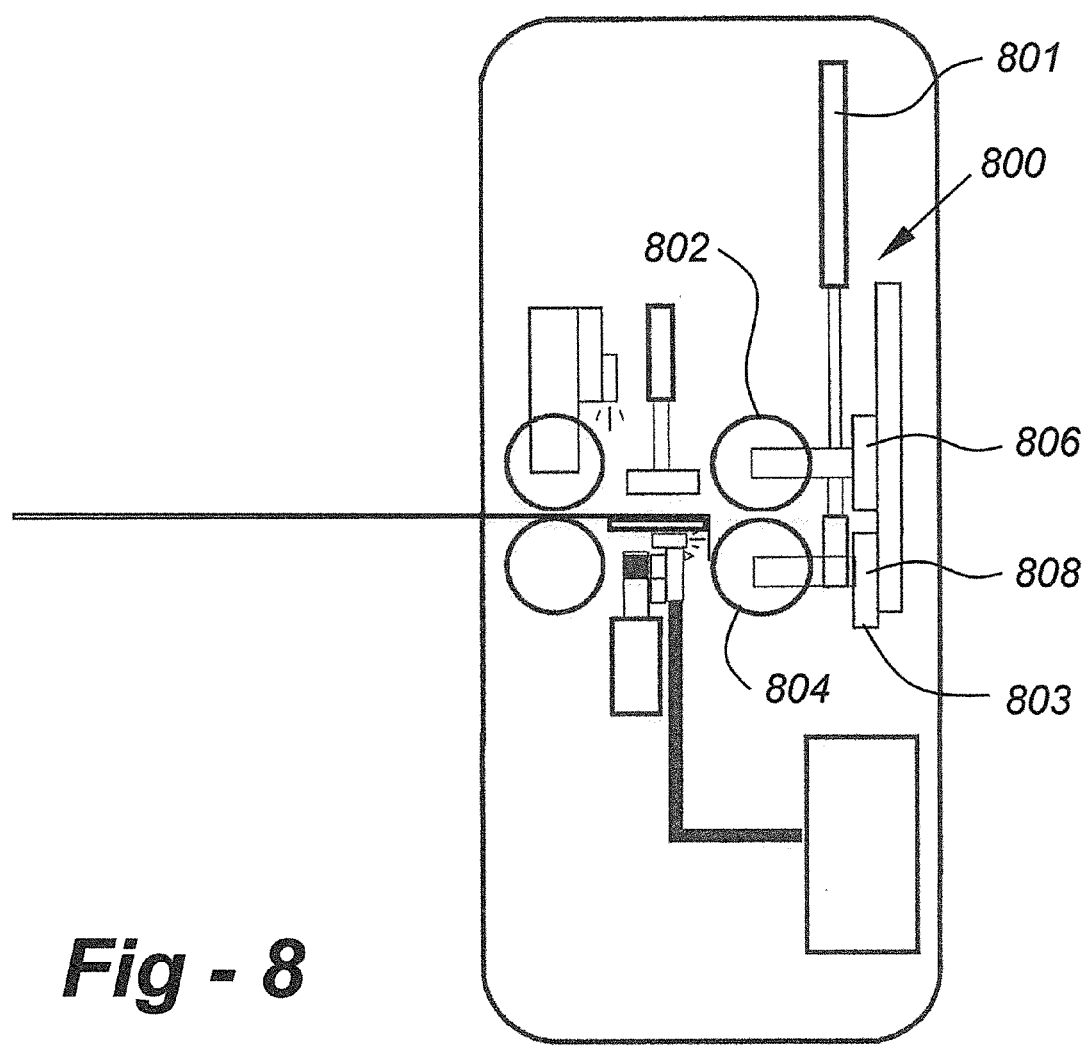
FIG. 8 shows rollers vertically positioned above the glue joint at the stop position.

In FIG. 8, rollers 804, 806 are vertically positioned above the glue joint at the stop position. The out-feed nip is actuated downward, forcing the glue joint portion of the sheet to be folded downward at angle (70 to 110 degrees relative to the main portion of the sheet). The glue joint portion is forced downwardly, which folds at the end portion of the plate mandrel.

Figure 10:
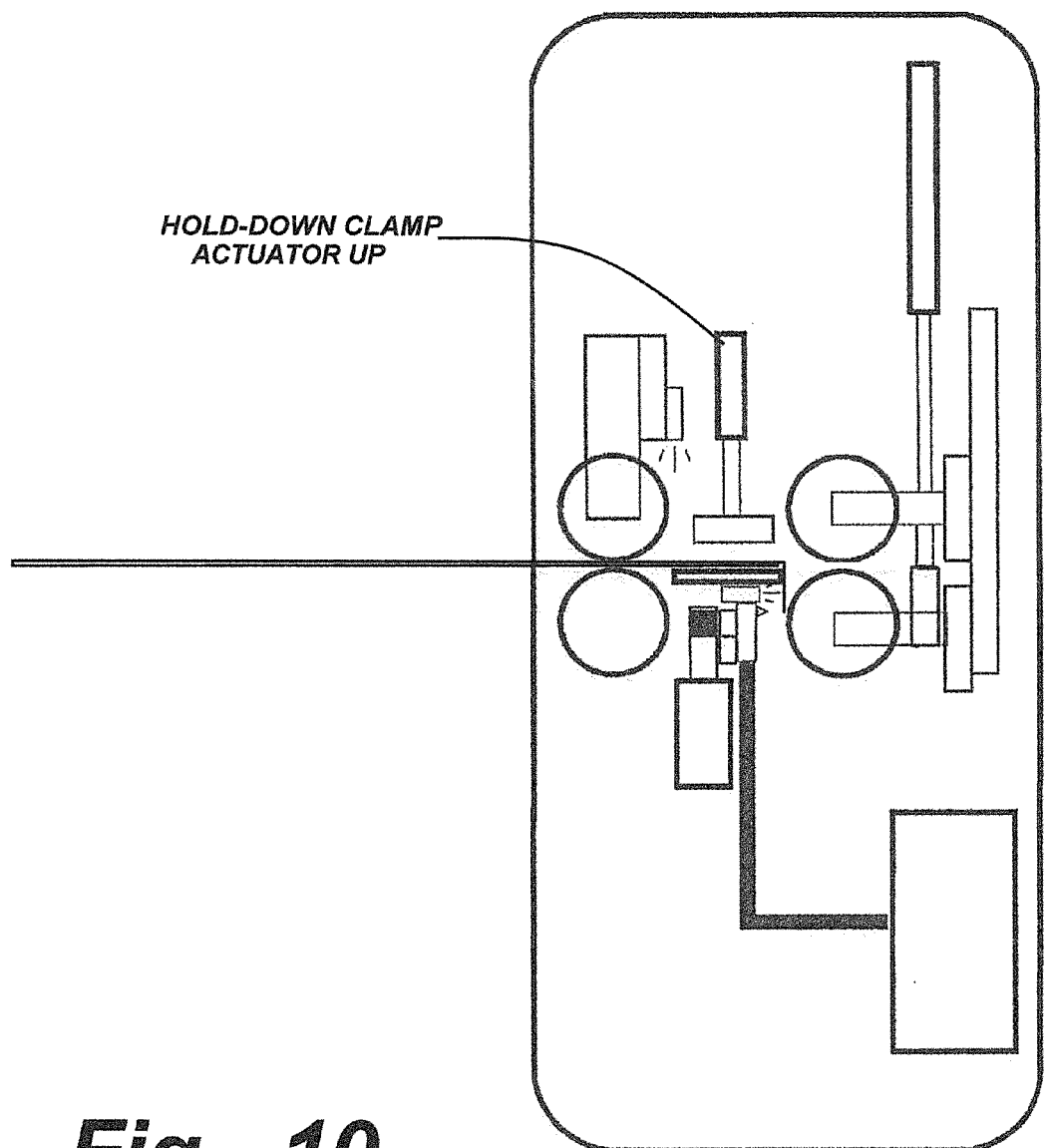
FIG. 10 illustrates the hold-down clamp being released upwardly.
Figure 11:
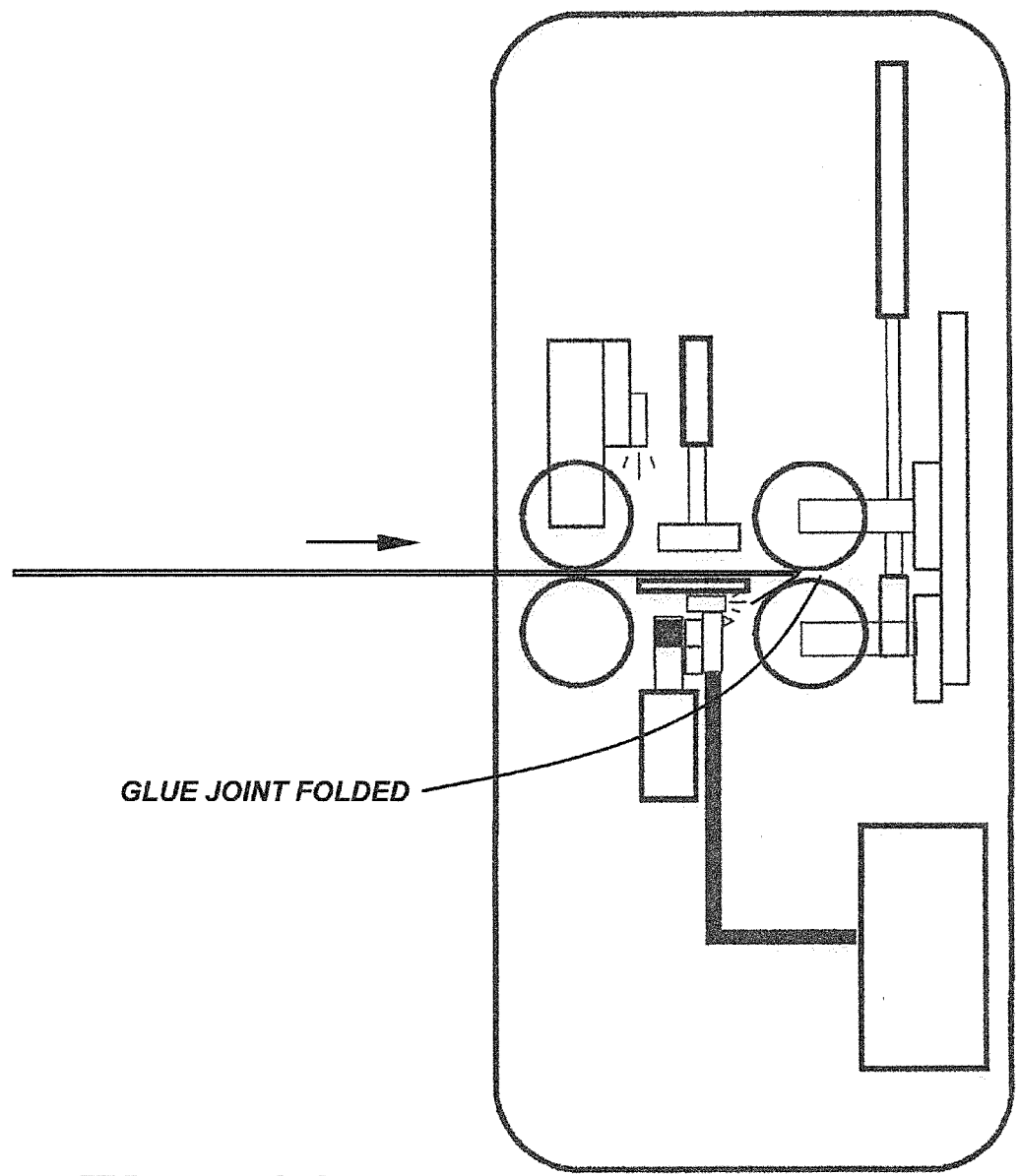
FIG. 11 shows the sheet being conveyed forward in the machine direction.

The glue applicator is positioned at a start position then moved across the machine via belt 902 to detect the glue joint using photo sensor 710 (FIG. 9). The glue applicator applies glue 900 to the glue joint during travel until reaching a stop position. The glue pattern may be continuous, dotted, dashed, or any combination thereof. The hold-down clamp is then released upwardly (FIG. 10), and the sheet is conveyed forward in the machine direction (FIG. 11). The glue joint angle is forced further from 90 degrees to 180 relative to the initial position at the stop position as it is conveyed through the out-feed nip.

Figure 12:
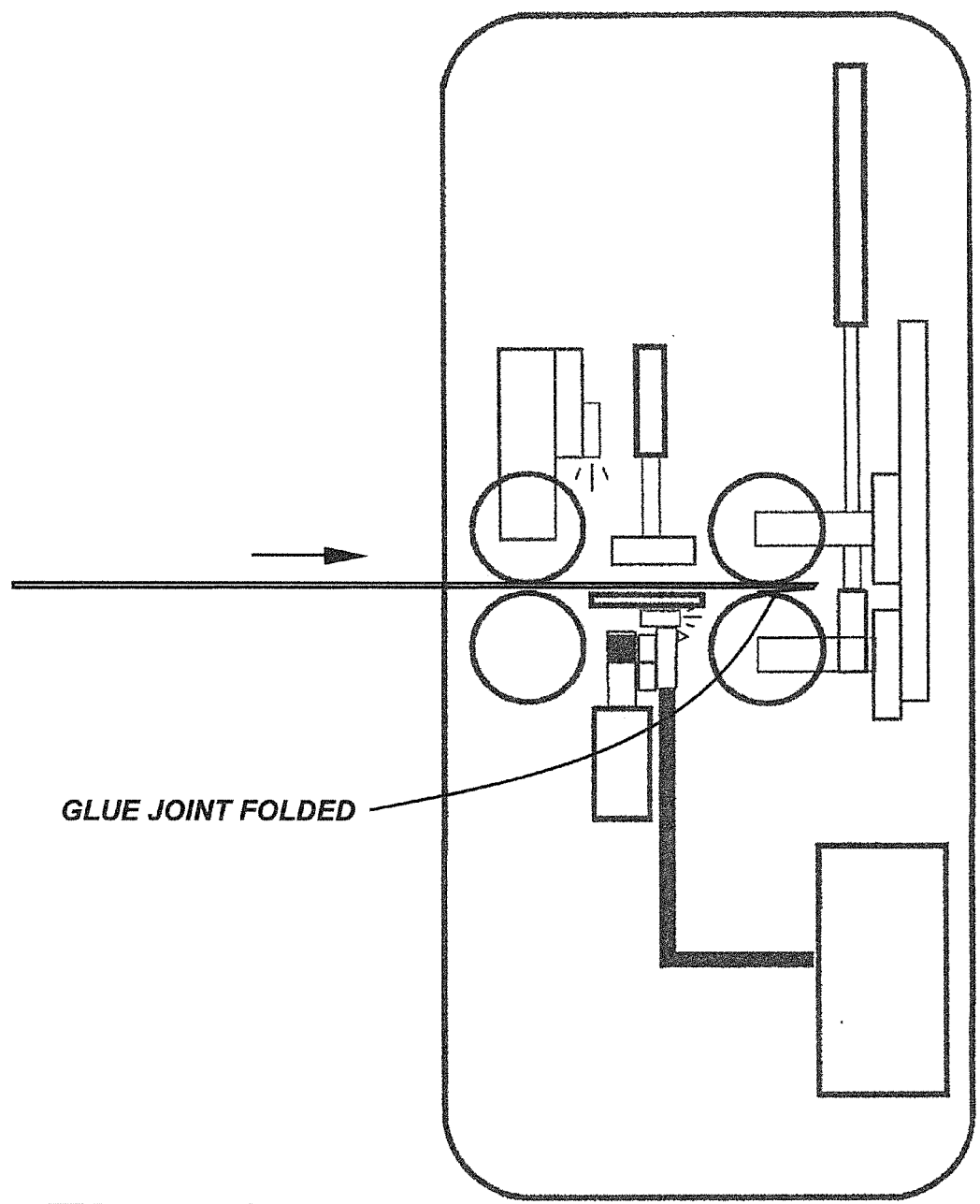
FIG. 12 depicts how the out-feed nip presses the glue joint against the head of the sheet as the sheet is conveyed.
Figure 13:
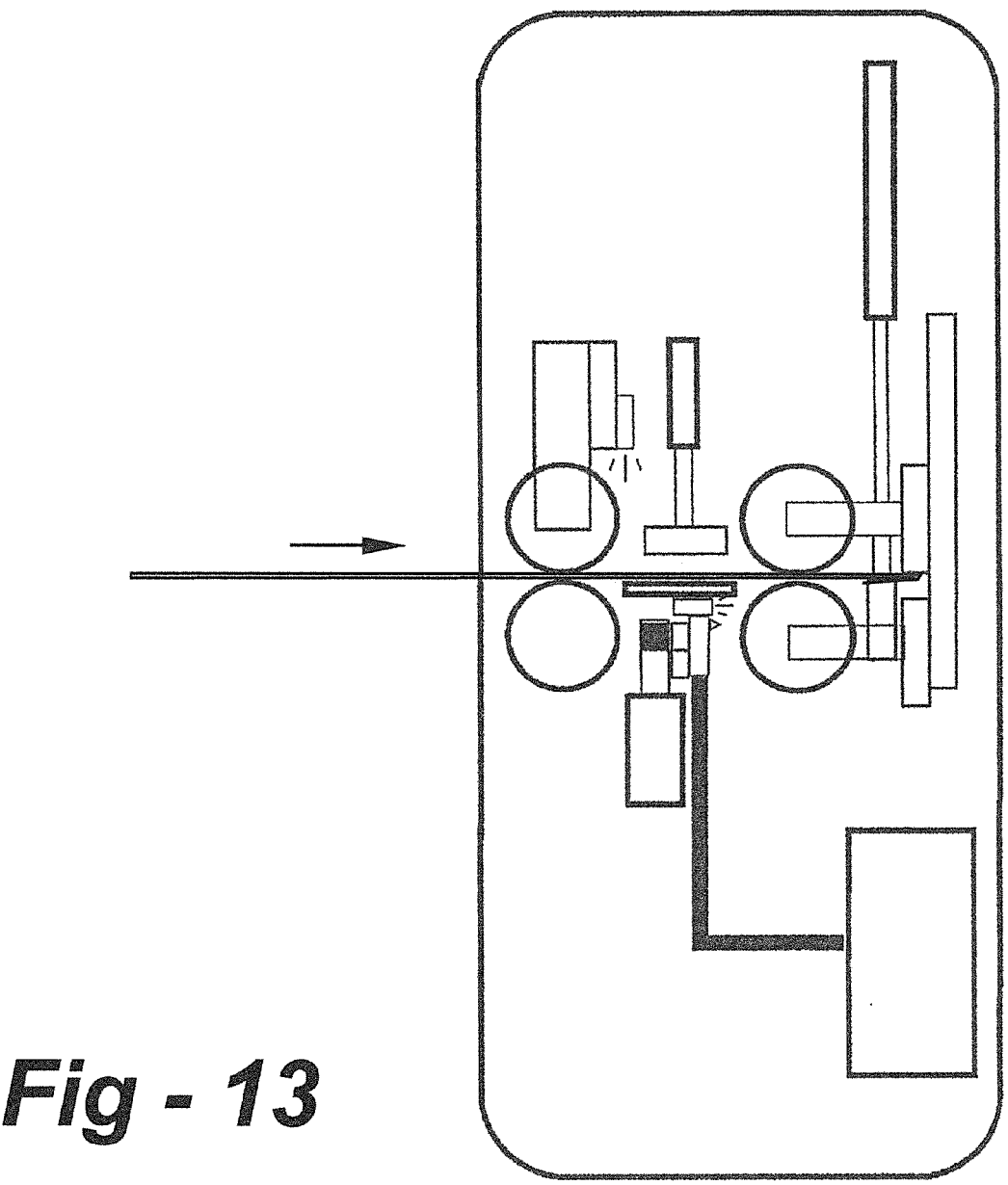
FIG. 13 shows how the adhesive bonds the glue joint with the head of the sheet as the sheet is conveyed through the out-feed nip.
Figure 14:
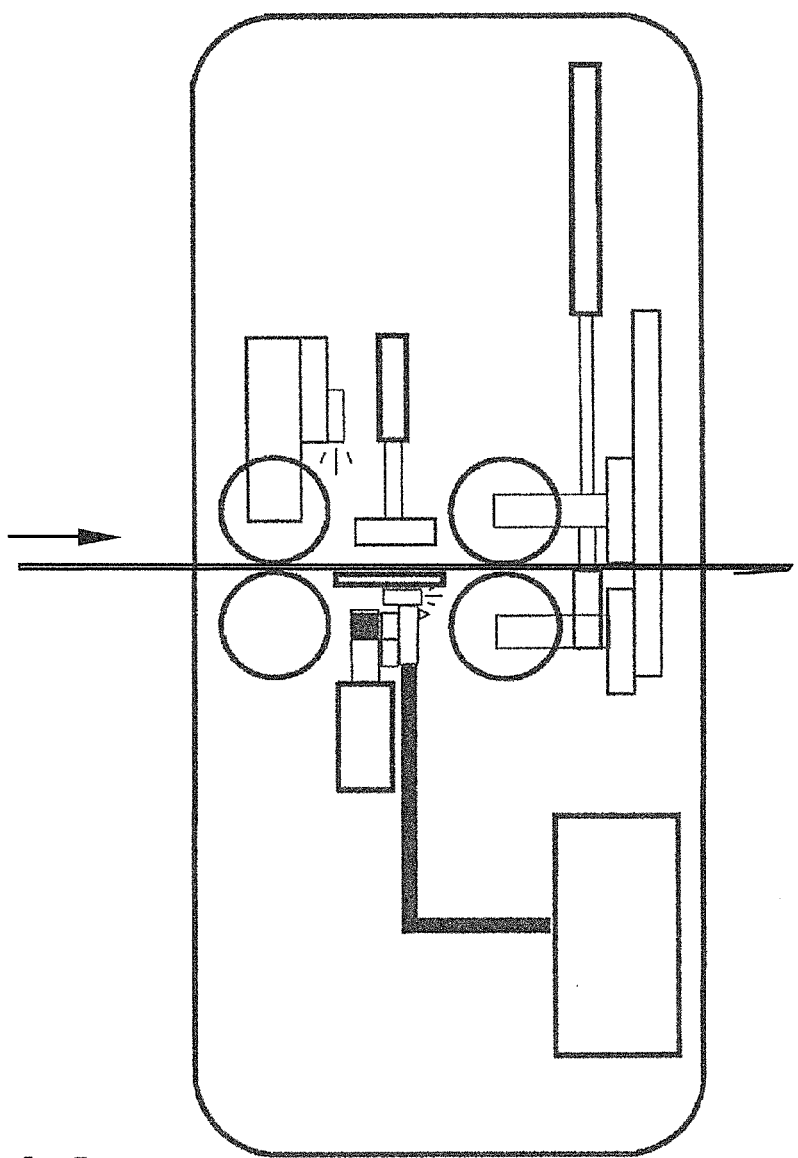
FIG. 14 illustrates how the glued sheet is conveyed out of the machine in the machine direction.
Figure 15:
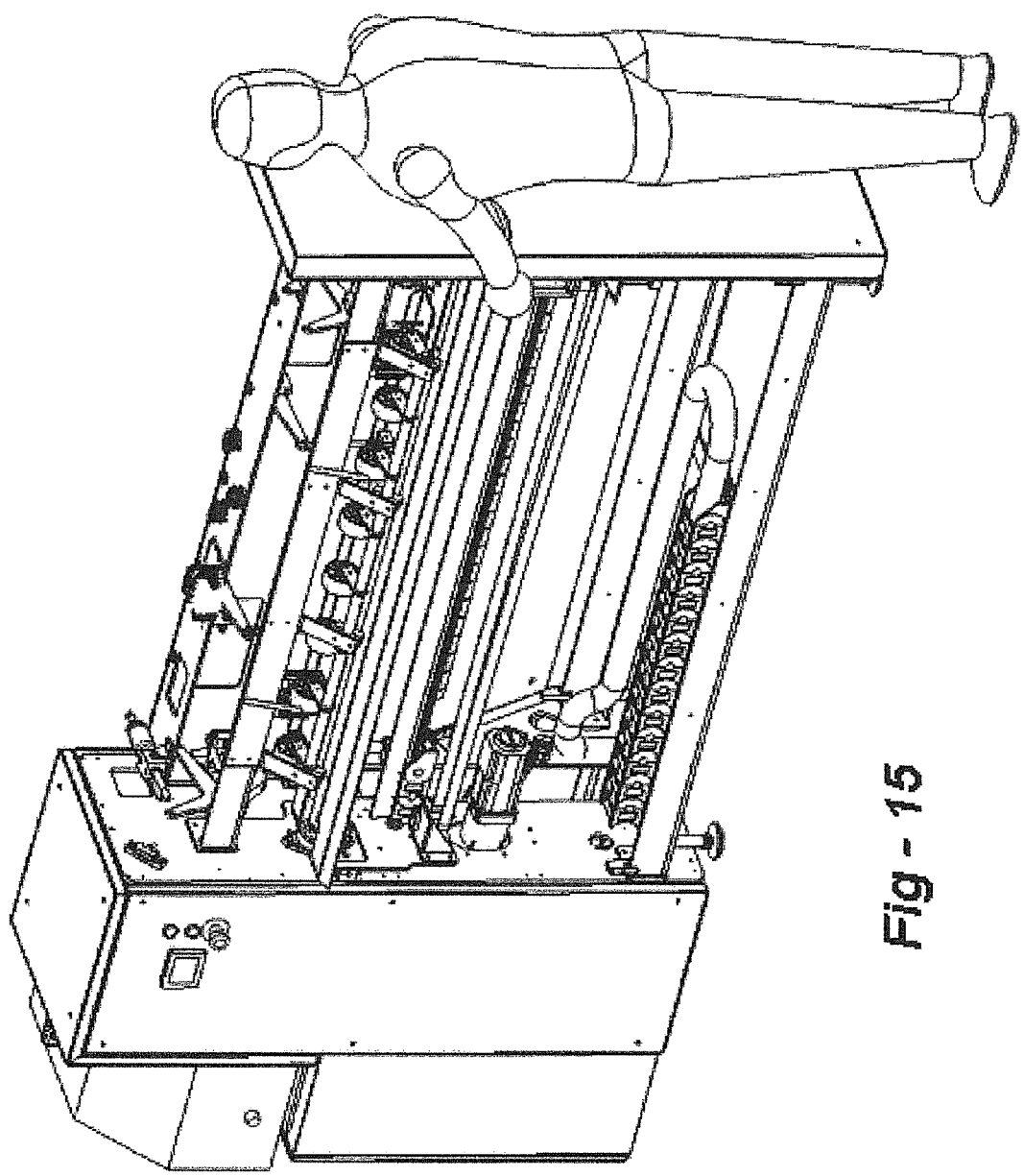
FIG. 15 is a simplified, perspective view of an operator standing at the machine.

The out-feed nip presses the glue joint against the head of the sheet as the sheet is conveyed (FIG. 12). The adhesive bonds the glue joint with the head of the sheet as the sheet is conveyed through the out-feed nip (FIG. 13). The glued sheet is then conveyed out of the machine either in the machine direction (FIG. 14) or in reverse machine direction back toward the operator. FIG. 15 is a simplified, perspective view of an operator standing at the machine.

The invention claimed is:

1. A machine for gluing sheet stock having a head end terminating in an edge and a tail end, comprising:
   an input nip for receiving the sheet stock pre-folded along a line parallel to the head and tail ends in overlapping registration, with the tail end extending beyond the edge of the head end;
   a clamp mechanism for holding the overlapping sheet stock in position;
   a folding mechanism for applying an initial fold to sheet stock while clamped, such that the tail end is partially bent over the edge of the head end;
   a glue applicator for applying glue to the initially folded tail end while the sheet stock is clamped;
   an output nip for receiving the initially folded tail end with the glue applied, the output nip being operative to continue folding the tail end over the head end, thereby pressing the glued side of the tail end against the head end;
   wherein the glued sheet stock is ejected out of the machine through the input nip.

2. The machine of claim 1, wherein the input and output nips are implemented with sets of upper and lower rollers.

3. The machine of claim 1, wherein the glue applicator moves along the tail end to apply the glue in any desired pattern.

4. The machine of claim 1, wherein the sheet stock is paper, cardboard, carton stock, corrugated, plastic sheet, or fibrous material.

5. The machine of claim 1, wherein the glue is a hot- or cold-melt adhesive of any appropriate formulation.

6. The machine of claim 1, wherein, with the exception of the folded tail end, the overlapping sheet stock remains flat as it is processed.

7. The machine of claim 1, wherein:
   the output nip is implemented with opposing rollers; and
   one of the rollers functions as the folding mechanism.

8. A machine for gluing sheet stock having a head end terminating in an edge and a tail end, comprising:
   an input nip for receiving the sheet stock pre-folded along a line parallel to the head and tail ends in overlapping registration, with the tail end extending beyond the edge of the head end;
   a clamp mechanism for holding the overlapping sheet stock in position;

a folding mechanism for applying an initial fold to sheet stock while clamped, such that the tail end is partially bent over the edge of the head end;

a glue applicator for applying glue to the initially folded tail end while the sheet stock is clamped;

an output nip for receiving the initially folded tail end with the glue applied, the output nip being operative to continue folding the tail end over the head end, thereby pressing the glued side of the tail end against the head end;

wherein one or both of the input and output nips eject the sheet stock once the tail end has been glued to the head end; and wherein, with the exception of the folded tail end, the overlapping sheet stock remains flat as it is processed.

9. The machine of claim 8, wherein the input and output nips are implemented with sets of upper and lower rollers.

10. The machine of claim 8, wherein the glue applicator moves along the tail end to apply the glue in any desired pattern.

11. The machine of claim 8, wherein the glued sheet stock is ejected out of the machine through the output nip.

12. The machine of claim 8, wherein the glued sheet stock is ejected out of the machine through the input nip.

13. The machine of claim 8, wherein the sheet stock is paper, cardboard, carton stock, corrugated, plastic sheet, or fibrous material.

14. The machine of claim 8, wherein the glue is a hot- or cold-melt adhesive of any appropriate formulation.

15. The machine of claim 8, wherein, with the exception of the folded tail end, the overlapping sheet stock remains flat as it is processed.

16. The machine of claim 8, wherein:

the output nip is implemented with opposing rollers; and one of the rollers functions as the folding mechanism.

\* \* \* \* \*